United States Patent
Monir Vaghefi et al.

(10) Patent No.: US 10,623,066 B2
(45) Date of Patent: Apr. 14, 2020

(54) HIGH ALTITUDE PLATFORM CELLULAR SYSTEMS

(71) Applicant: Blue Danube Systems, Inc., Warren, NJ (US)

(72) Inventors: Sayed Reza Monir Vaghefi, Campbell, CA (US); Gregg S. Nardozza, Madison, NJ (US)

(*) Notice: Subject to any disclaimer, the term of this patent is extended or adjusted under 35 U.S.C. 154(b) by 0 days.

(21) Appl. No.: 16/433,818

(22) Filed: Jun. 6, 2019

(65) Prior Publication Data

US 2019/0379432 A1    Dec. 12, 2019

Related U.S. Application Data

(60) Provisional application No. 62/681,818, filed on Jun. 7, 2018.

(51) Int. Cl.
| | | |
|---|---|---|
| *H04B 7/0408* | (2017.01) | |
| *H04B 7/204* | (2006.01) | |
| *H04B 7/0426* | (2017.01) | |

(52) U.S. Cl.
CPC ........... *H04B 7/0408* (2013.01); *H04B 7/043* (2013.01); *H04B 7/2041* (2013.01)

(58) Field of Classification Search
None
See application file for complete search history.

(56) References Cited

U.S. PATENT DOCUMENTS

| | | |
|---|---|---|
| 5,642,122 A | 6/1997 | Lockie et al. |
| 6,157,621 A | 12/2000 | Brown et al. |
| 2016/0105806 A1* | 4/2016 | Noerpel ................. H04B 7/185 455/12.1 |
| 2017/0093363 A1* | 3/2017 | Tabatabai ................. H03H 7/20 |
| 2017/0324469 A1 | 11/2017 | Jalali |
| 2018/0166779 A1* | 6/2018 | Feria ................... H04B 7/18506 |

FOREIGN PATENT DOCUMENTS

EP        0755578        1/1997

\* cited by examiner

*Primary Examiner* — Kevin Kim
(74) *Attorney, Agent, or Firm* — Occhiuti & Rohlicek LLP

(57) ABSTRACT

A method of providing cellular coverage involving: using an antenna system including S 2-dimensional, downward tilting phased array panels arranged about a common vertical axis, wherein with the S panels are organized into a plurality of groups, each of which includes L adjacent panels; generating a first plurality of narrow beams covering a first plurality of cells forming an outer ring of cellular coverage; and generating a second plurality of narrow beams covering a second plurality of cells forming an inner ring of coverage, wherein generating the first plurality of narrow beams involves, with each panel, generating N narrow beams of the first plurality of narrow beams; and wherein generating the second plurality of narrow beams involves, with each group of panels, generating M narrow beams of the second plurality of narrow beams.

21 Claims, 17 Drawing Sheets

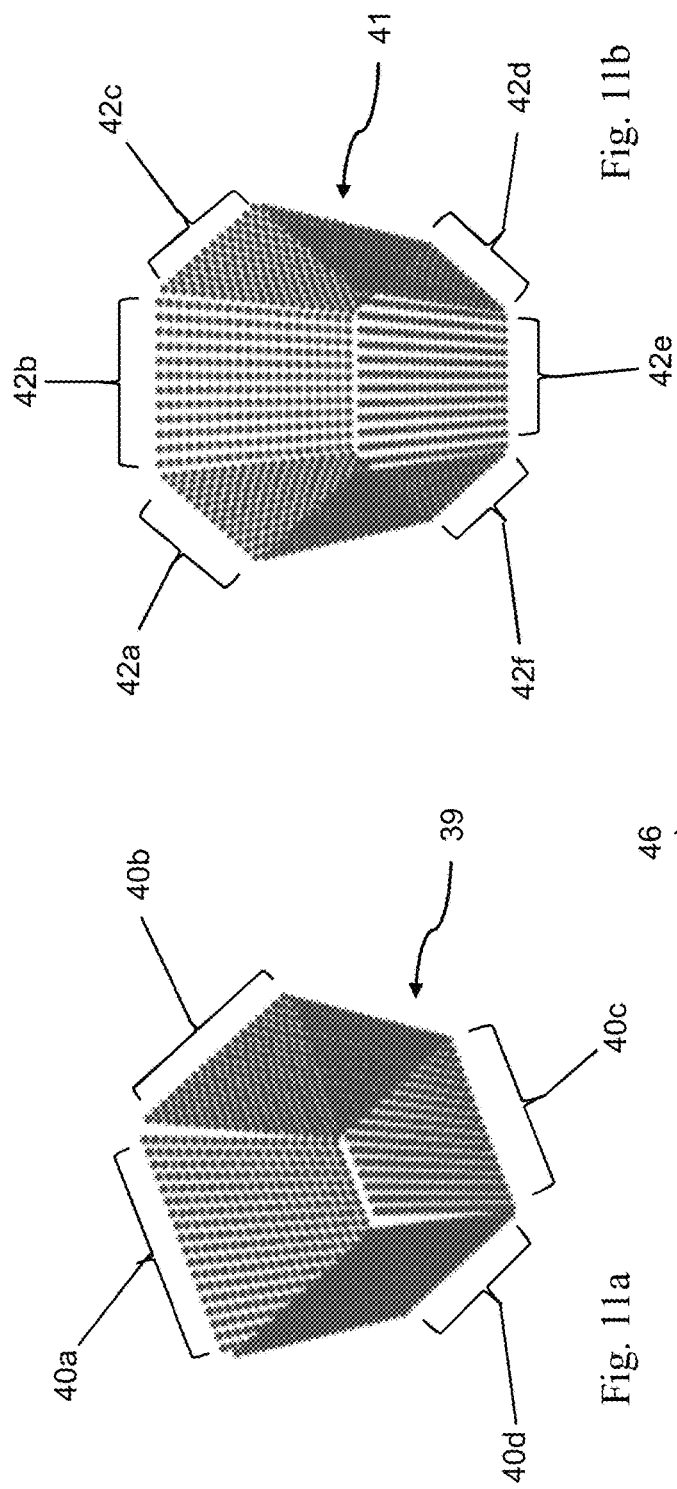
Fig. 11b
Fig. 11a
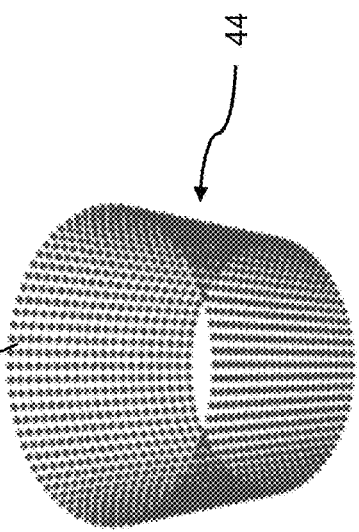
Fig. 11c

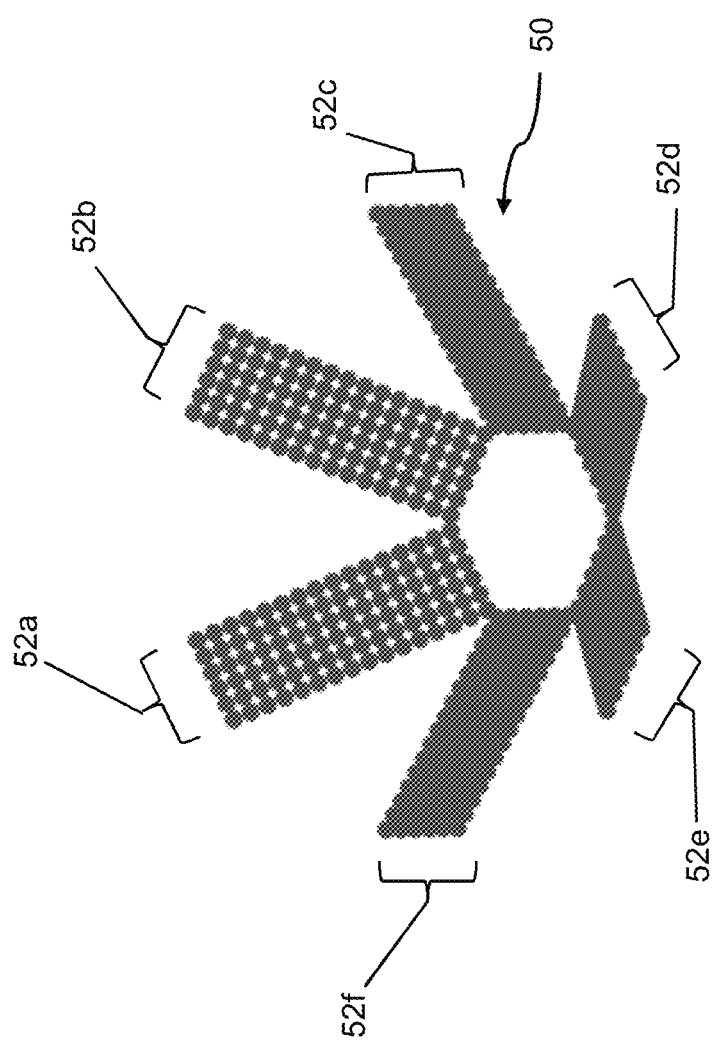

HIGH ALTITUDE PLATFORM CELLULAR SYSTEMS

This application claims the benefit under 35 U.S.C. 119(e) of Provisional Application Ser. No. 62/681,818, filed Jun. 7, 2018, entitled "High Altitude Platform Cellular Systems," the entire contents of which are incorporated herein by reference.

TECHNICAL FIELD

Embodiments of the invention generally relate to antennas for cellular communications systems, more specifically to antenna systems which are mounted at a relatively high location above the earth such as on a high altitude platform (HAP) or a very tall tower.

BACKGROUND

Antennas mounted on high altitude platforms (HAPs) can be used to implement a cellular system for wireless communications with users on the ground from a base station located at high altitude. HAPs, such as blimps or aerial vehicles, have several limitations which make designing an antenna for cellular system challenging. First, since most HAPs obtain their required power from solar energy, they have very limited power available for all of the onboard communication equipment such as the base-band units (BBUs), backhaul systems, antennas, as well as other mechanical and monitoring equipment. Second, HAPs are typically installed at more than 20 km above the ground and the signal transmitted from a HAP to the users on the ground can experience large path losses. Third, HAPs are very costly to build. Therefore, to make a HAP-based cellular wireless network economically feasible, the number of HAPs that are deployed should be as few as possible for providing the desired coverage over the entire target region.

Since the path losses between the base station and users is significant and the available transmit power is quite limited, large phased array antennas or antennas with large antenna gain (such as horn antennas or dish antennas) are typically used for HAP wireless communication applications. The higher antenna gains of such antenna systems are used to compensate for the larger path losses. The large phased array is more suitable for HAP cellular applications, as multiple narrow beams can be generated by a single antenna panel for multiple cells, thereby increasing network throughput without increasing deployment cost.

Traditionally, planar phased array antennas have been proposed for HAP cellular systems where the panel is installed underneath the HAP and is used to create multiple narrow beams. In that case, a cell is created on the ground by generating a beam (or a pair of beams in the case of cross-polarized elements). FIG. 1 shows the schematic representation of a HAP 1 with a planar array 2 installed underneath of the HAP. The normal of the panel is perpendicular to the HAP and vertical to the ground (e.g. the panel is parallel to the ground). The planar array 2 is used to generate two beams 3 and 4 which represent two cells on the ground. Similar to terrestrial networks, each cell is controlled by a BBU (not shown) and mobile users need to be handed over from one cell to another depending on which cell provides the best signal. The size of the array and the number of beams that are generated by the array are designed based on user density and required network capacity and coverage. For instance, more cells (more narrow beams) provide higher capacity with the consequence of requiring a larger array to create more narrow beams and to avoid inter-beam interference.

FIG. 2 shows the signal-to-interference-plus-noise ratio (SINR) contour of a HAP-based cellular system using a 14×14 planar cross-polarized array. The HAP is located at 20 km above the ground. Nineteen cells with intercell distance (ICD) of 6 km are created by forming 19 narrow beams with cross polarization diversity (38 beams in total). The coverage region of this panel is an area with a radius of 13 km. FIG. 2 shows that the cell at the center which is located at the boresight of the antenna has circular shape and as one moves away from the boresight, the beam shapes become asymmetric due to the increasing scan angle of the panel. The intercell distance can be adjusted to achieve the required coverage and capacity to be delivered by HAP. For a specific array size, there is usually an optimal ICD which delivers the maximum capacity. The optimal ICD can be found using intensive simulations. FIG. 3 shows the simulation results of the capacity performance of a 14×14 planar array versus ICD. The optimal capacity for this specific panel is achieved at ICD of 6 km.

The number of cells (i.e., beams) and quality of signal in each cell determine the capacity that can be delivered by a HAP. The capacity of the covered area can be increased by increasing the number of cells. However, there is a trade-off since the inter-beam interference increases with an increasing number of cells. Thus, the number of cells cannot be increased without decreasing the beamwidth of each beam, which can be done by using a larger array.

While the capacity of the HAP can be improved by using a larger array and a higher number of cells, improving the coverage region is difficult. One can argue that the coverage region can be increased by increasing ICD. However, increasing ICD creates outage areas in the network. FIG. 4 shows the simulation results for the outage performance of a HAP-based cellular system using a 14×14 cross-polarized planar array. Outage is defined as the percentage of the covered area receiving SINR of −5 dB or lower. It can be seen that as ICD increases, the outage grows rapidly in the network. Therefore, for this specific antenna array, the beams cannot be placed further than 8 km apart to maintain a reasonable amount of outage. This is mainly because each cell is generated by a narrow beam and the narrow beam of a 14×14 planar array has a very sharp roll-off, meaning that the antenna gain decreases rapidly as one moves away from the boresight of the beam, as shown in FIG. 5. At a large ICD, a narrow beam cannot cover the entire region inside the cell with good signal quality, creating a large amount of outage. This is illustrated in FIG. 6, which shows the SINR contour of 14×14 panel with an ICD of 10 km. Notice that large areas between beams are not covered with good signal quality. One can decrease the size of panel to create wider beams for larger coverage; however, as the size of the panel decreases, the antenna gain decreases as well, and thus signal strength for users on the ground will suffer.

SUMMARY

In this disclosure, a method and apparatus for creating a cellular system for wireless communications with users on the ground from a base station located at a high altitude is presented.

In general, in one aspect, the invention features a method of providing cellular coverage on the ground. The method involves: locating an antenna system above the earth, the antenna system comprising S phased array panels arranged about a common vertical axis, wherein each phased array panel of the S phased array panels is an array of antenna elements and has a downward tilt, wherein the S phased array panels are organized into a plurality of groups of phased array panels, each group of phased array panels among the plurality of groups of phased array panels including an integer number of adjacent phased array panels among the S phased array panels, wherein L is an integer greater than 1, and S is an integer greater than L; generating a first plurality of narrow directed beams covering a first plurality of cells, the first plurality of cells forming an outer ring of cellular coverage on the surface of the earth; and generating a second plurality of narrow directed beams covering a second plurality of cells, the second plurality of cells forming an inner ring of coverage on the surface of the earth, wherein the inner ring of coverage is within the outer ring of coverage, wherein generating the first plurality of narrow directed beams comprises, with each phased array panel of the S phased array panels, generating N narrow directed beams of the first plurality of narrow directed beams, wherein N is an integer greater than 1; and wherein generating the second plurality of narrow directed beams comprises, with each group of phased array panels among the plurality of groups of phased array panels, generating M narrow directed beams of the second plurality of narrow directed beams, wherein M is an integer greater than 0.

In general, in another aspect, the invention features a method of operating an antenna system to provide cellular coverage on the ground, the antenna system comprising S phased array panels arranged about a common vertical axis, wherein each phased array panel of the S phased array panels is an array of antenna elements and has a downward tilt, wherein the S phased array panels are organized into a plurality of groups of phased array panels, each group of phased array panels among the plurality of groups of phased array panels including an integer number of adjacent phased array panels among the S phased array panels, wherein L is an integer greater than 1, and S is an integer greater than L. The method involves: generating a first plurality of narrow directed beams covering a first plurality of cells, the first plurality of cells forming an outer ring of cellular coverage on the surface of the earth; and generating a second plurality of narrow directed beams covering a second plurality of cells, the second plurality of cells forming an inner ring of coverage on the surface of the earth, wherein the inner ring of coverage is within the outer ring of coverage, wherein generating the first plurality of narrow directed beams comprises, with each phased array panel of the S phased array panels, generating N narrow directed beams of the first plurality of narrow directed beams, wherein N is an integer greater than 1; and wherein generating the second plurality of narrow directed beams comprises, with each group of phased array panels among the plurality of groups of phased array panels, generating M narrow directed beams of the second plurality of narrow directed beams, wherein M is an integer greater than 0.

Other embodiments include one or more of the following features. Each phased array panel of the S phased array panels is a W by V two-dimensional array of antenna elements wherein W and V are integers greater than one. The method also includes using R rows of each phased array panel of the plurality of phased array panels to generate a boresight beam covering a region on the earth that is within the inner ring of coverage on the earth (e.g. a region on the earth that is aligned with the boresight of the antenna system), wherein R is an integer that is less than W. In some embodiments, N is 2 and the total number of narrow directed beams within the first plurality of narrow directed beams is 2S. The 2S narrow directed beams of the first plurality of narrow directed beams are evenly spaced around and within the outer ring. The outer ring includes 2S cells with the 2S narrow directed beams mapped to the 2S cells so that each cell of the 2S cells is covered by a corresponding different one of the 2S narrow directed beams. In some embodiments, L is 2 and M is 2 and the total number of narrow beams within the second plurality of narrow directed beams is S. The inner ring of coverage includes S/2 cells with the S narrow directed beams of the second plurality of narrow directed beams is mapped to the S/2 cells so that each cell of the S/2 cells is covered by a corresponding different pair of the S narrow directed beams of the second plurality of narrow directed beams. S is an even integer, e.g. selected from the group consisting of 4, 6, 8, and 12. In some embodiments, V is 1. The R rows of each phased array panel of the S phased array panels that are used to generate a narrow boresight beam are the lowest R rows of each phased array panel of the S phased array panels, wherein R is an integer that is less than W.

Given that HAPs have limited amounts of available power, one of the main advantages of various embodiments described herein is that a single antenna multi-panel array can be used to cover a large area. In addition, the embodiments described herein are especially novel for achieving wide coverage while avoiding high network outage. This along with the irregular pattern of coverage cells makes this a very unique solution which achieves both wide coverage area and high capacity, which is otherwise unachievable with a flat horizontal panel array structure underneath the HAP (or on a high tower).

BRIEF DESCRIPTION OF THE DRAWINGS

FIGS. 11a-c depict various other embodiments of the phased array antenna system.

FIG. 12 depicts a 6 panel phased array antenna system such as might be used instead of a 14×14 planar panel.

The details of one or more embodiments of the invention are set forth in the accompanying drawings and the description below. Other features, objects, and advantages of the invention will be apparent from the description and drawings, and from the claims.

DETAILED DESCRIPTION

Figure 7:
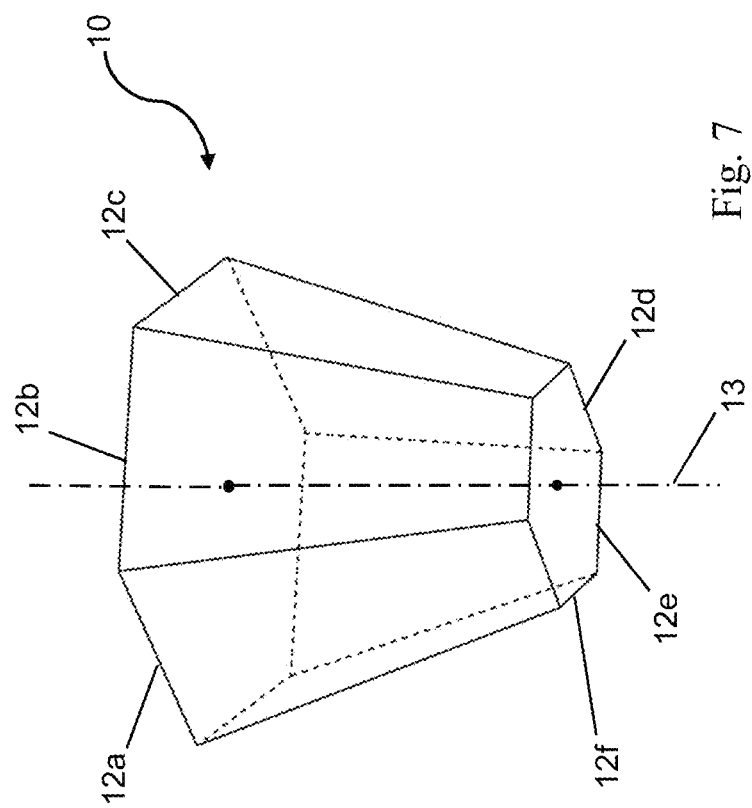
FIG. 7 is a schematic design of an antenna array that embodies the invention.

A novel phased array structure and method of operation is described below. Unlike the traditional configuration of HAP-based phased array antennas, the antenna of the described embodiment includes a number of phased array panels arranged in a regular pattern around a vertical axis. The panels are arranged to form a truncated polygonal pyramid shape with each panel forming one of the sides of the truncated polygonal pyramid. FIG. 7 shows an example for an implementation of a HAP-based phased array antenna 10 that is constructed from six phased array panels 12a-f (hereinafter the panels are also generally referred to as panels 12). The panels 12, each of which includes a two-dimensional array of antenna elements (not shown in the figure), are arranged around a central, vertical axis 13 and conform to the sides of a truncated hexagonal pyramid. Each panel 12 is tilted slightly downward. In other words, the normal of each panel 12 is much closer to being perpendicular to the vertical axis 13 as compared to parallel to the vertical axis 13, as is the case for the convention HAP antenna system designs. In the case of a system mounted on an aerial platform, such as a blimp, the larger top side of pyramid is attached to the bottom of the blimp and the smaller bottom side may or may not have a planar phased array mounted thereon with its normal parallel to and/or aligned with the vertical direction of the phased array antenna 10. Each phased array panel 12 of pyramid is used to generate multiple cells using narrow directed beams. The number of cells that are generated per side depends on the capacity requirements. The size of each panel 12 is optimized based on the number of cells that are needed per side to avoid inter-beam interference. The down tilt of each side is optimized based on both the coverage and capacity requirements; a smaller down tilt provides larger coverage with lower capacity, while a larger down tilt provides smaller coverage with higher capacity.

Figure 8:
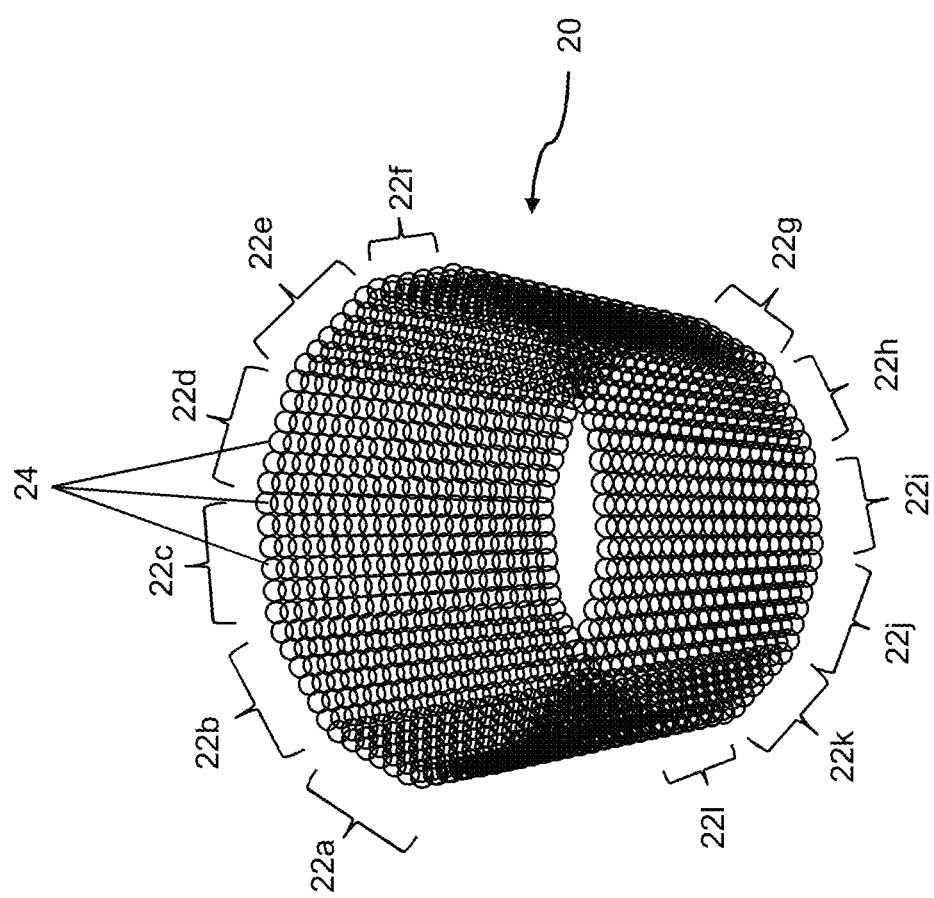
FIG. 8 is an example of the proposed antenna array with 12 sides, each side contain 20×6 antenna elements.

FIG. 8 illustrates another embodiment of the antenna array structure 20 with 12 phased array panels 22a-1, where each phased array panel 22 is flat, has a 9 degree down tilt (i.e., 9 degrees away from perpendicular to the vertical axis), and contains 20×6 (i.e., 120) antenna elements 24. That is, each panel 22 is a two-dimensional array of antenna elements 24, wherein the array is made up of 20 rows of antenna elements 24 with 6 antenna elements 24 per row.

Figure 9A:
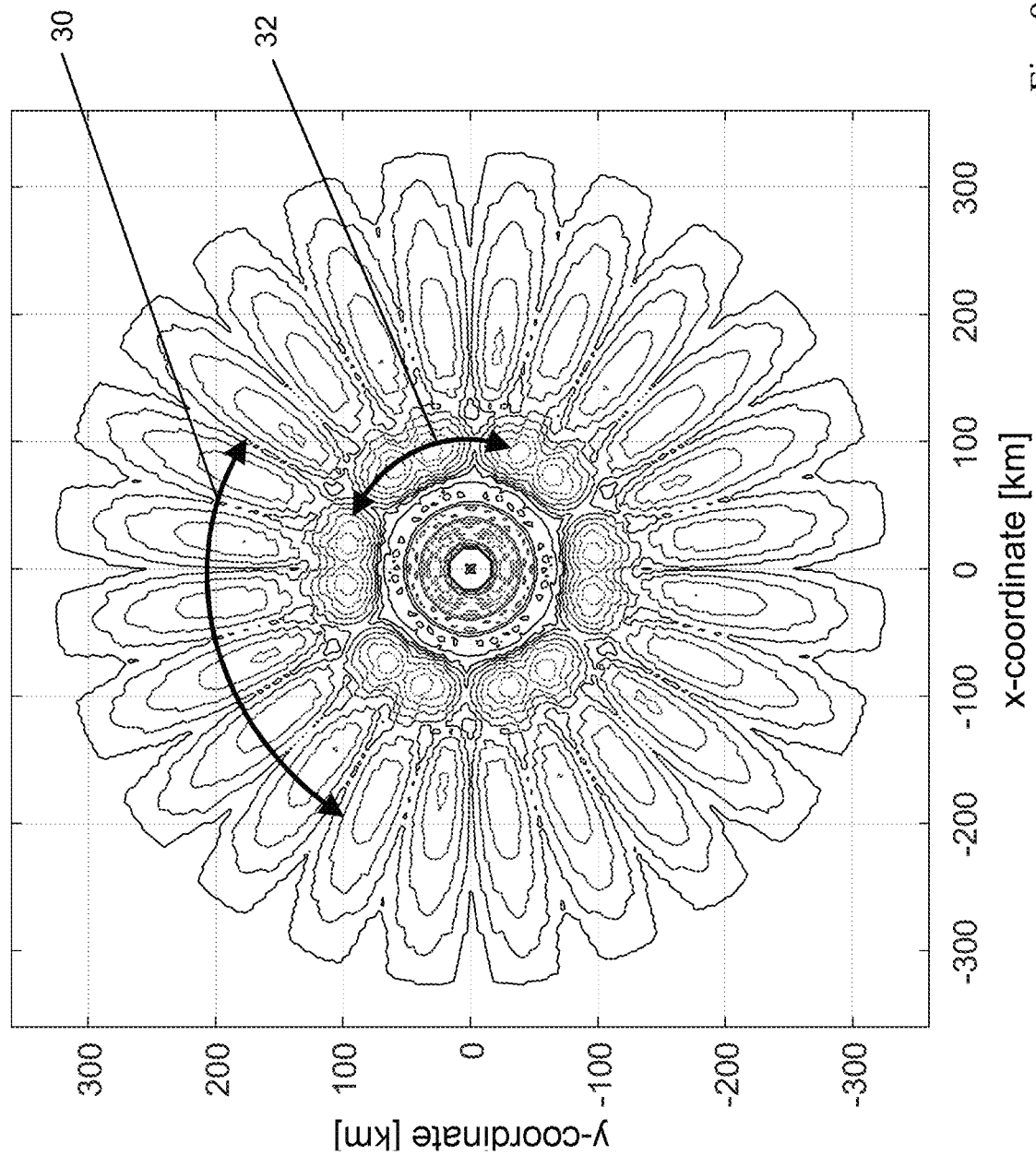
FIGS. 9a and b illustrate an example of the proposed cell planning with three rings and 31 cells.
Figure 9B:
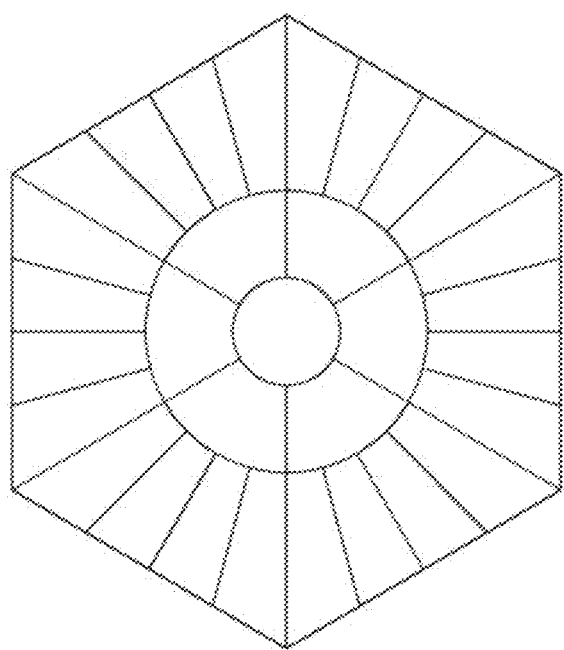

FIG. 9a shows an example of the proposed cell planning for large area coverage using the antenna system illustrated by FIG. 8. For this case, the cells on the ground are not hexagonal. The cells are placed such that each cell carries the same amount of traffic. The coverage region is divided into multiple rings and there are multiple cells per ring. In the example shown in FIG. 9, there are two concentric rings of cells, i.e., an outer ring, an inner ring, and there is a circular central region.

Figure 10:
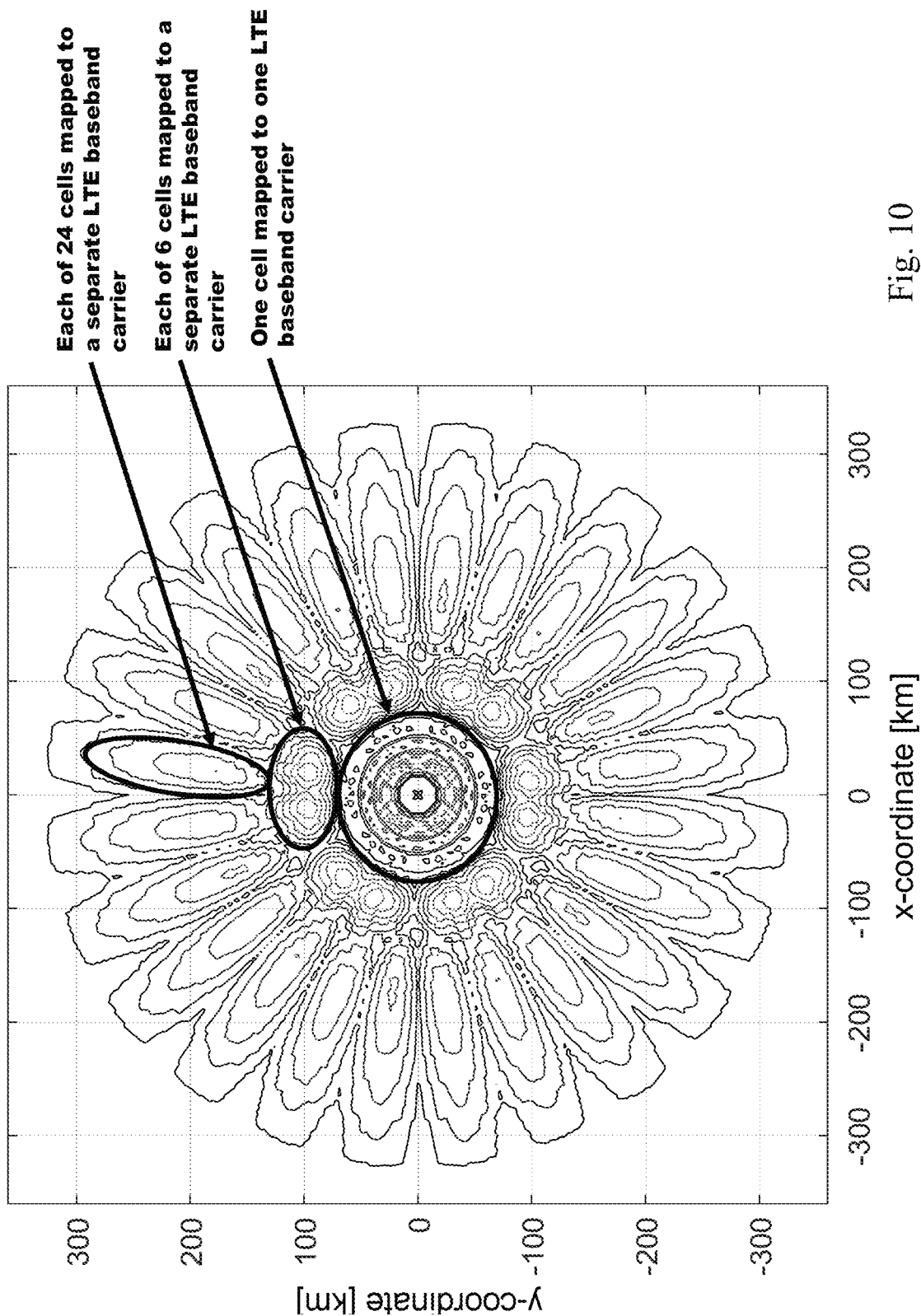
FIG. 10 illustrates an example of the proposed cell planning with three rings and 31 cells with mapping to baseband LTE carriers.

The outer ring has the largest radius and contains 24 cells. The antenna system uses each of the twelve 20×6 phased array panels to generate two of these cells by forming two adjacent narrow directed beams. This requires coherence across all 120 antenna elements of a phased array panel. To achieve the required capacity in this example, each beam is mapped back to a separate LTE carrier in the baseband equipment, and thus represents a separate cell (see FIG. 10).

The middle ring contains six cells. To generate the beams that support these cells, the twelve phased array panels are grouped into six sets of adjacent pairs of phased array panels. The antenna system then uses each adjacent pair of phased array panels to generate two adjacent narrow directed beams and each pair of adjacent beams forms a corresponding different one of the six cells in the inner ring. In this case, coherence is required across all 240 antenna elements of each pair of adjacent phased array panels. To achieve the required capacity in this example, each pair of adjacent beams formed by a grouped pair of array faces is mapped back to a separate LTE carrier in the baseband equipment, and thus represents a separate cell (see FIG. 10)

The circular central region has a smaller radius than that of the inner ring and contains only one cell. The antenna system uses the lower five rows of antenna elements on all 12 of the phased array panels to generate a single beam that covers the cell defined by the central region. For this, coherence is required across all 360 antenna elements of the lower five rows of the entire array structure. To achieve the required capacity in this example, the entire cell is mapped back to a single LTE carrier in the baseband equipment. (see FIG. 10). Note that in this embodiment a separate antenna array across the bottom of the structure would not be a substitute for using the lower five rows around the array structure because it would not form a wide enough coverage beam with high enough gain.

Using the antenna system illustrated by FIG. 8, there are a total of 31 cells generated from the array. The reason there was one beam per cell for the outer ring and two beams for the middle ring is to make sure all cells have the same coverage region. It is desirable to have the coverage region of cells be almost the same across the entire network. Since, the beams in the middle rings are covering smaller regions, two beams are needed for each cell.

Each cell is controlled by a baseband unit (BBU) and operates within a specific bandwidth (e.g., 5 MHz, 10 MHz, etc.). A mobile user attaches to a single cell with the best SINR and it performs a handover between cells if it finds a cell with better SINR.

FIG. 9a shows the SINR contour for the antenna system of FIG. 8. The coverage region of this HAP-based antenna array is an area with the radius of more than 330 km. Such a large coverage region is very difficult to create using traditional planar arrays. The outer boundaries of the 31 cells of FIG. 9a are more clearly shown in FIG. 9b which makes it more readily apparent that the cells are all approximately the same size.

There are many possible alternative designs for the antenna system on the HAP. Technically, it can start with three sides and then more sides can be added as required to eventually converge to a truncated cone. Other examples of antenna systems for use on HAPs are illustrated in FIGS. 11a-c. FIG. 11 shows a phased array antenna 39 made up of four 20×8 planar phased array panels 40a-d, each with a slight down tilt. FIG. 11b shows a phased array antenna 41 made up of six 20×12 planar phased array panels 41a-f, each with a slight down tilt. And FIG. 11c shows a phased array antenna 44 in the form of a truncated cone that employs 72 20×1 planar phased array panels each with a slight down tilt. Many other embodiments are possible.

Simulations of the embodiments shown in FIGS. 8 and 11c indicate that their performance is similar, so it depends which one is easier to manufacture and calibrate.

With a 14×14 planar array and a transmit power limitation of 260 W, simulations show that it is possible to cover a region with radius of 28 km. Beyond that, the outage becomes significant, and it is not practical to use a planar array to achieve the desired coverage. In contrast, the embodiments described herein can be used for covering larger areas. For example, a six-panel array with each panel being a 16×6 antenna array can be used to cover a region with radius of 25 km. In that case, the down-tilt of the panel needs to be substantial and because of that the lower 5 rows of antenna elements in the six arrays cannot be used to provide cell coverage around the bore sight since the resulting structure (with the gaps between panels) is not suitable for doing that. For the bore sight coverage, a planar array of 9×9 right below the HAP can be used. So, for any coverage from 25 km to 350 km, one can design an appropriate antenna structure by changing the number of sides, down tilt, shape, number of antenna elements, etc.

Simulations also show that in many cases three rings are enough to achieve the desired coverage ground. However, that's not a hard and fast rule. For the antenna size described above (i.e., 12 panels of 20×6 antenna elements), it may not be practical to fit more than three rings. But, if one uses a larger antenna, it might be more appropriate to create four rings of cells. In some cases, one might only want to have two rings, again depending on the antenna size.

It should be noted that the down tilt of each side, the number antenna elements per side, the number of cells per ring, the beam shapes, and the beam spacing can be optimized based on the HAP coverage and capacity requirements.

Equipment in a HAP, such as a blimp, is basically identical to what is used in ground-based systems. Examples of the hardware that can be used to operate each of the panels in the phased array antenna systems described above are shown in FIGS. 13-16 and described below.

Figure 13:
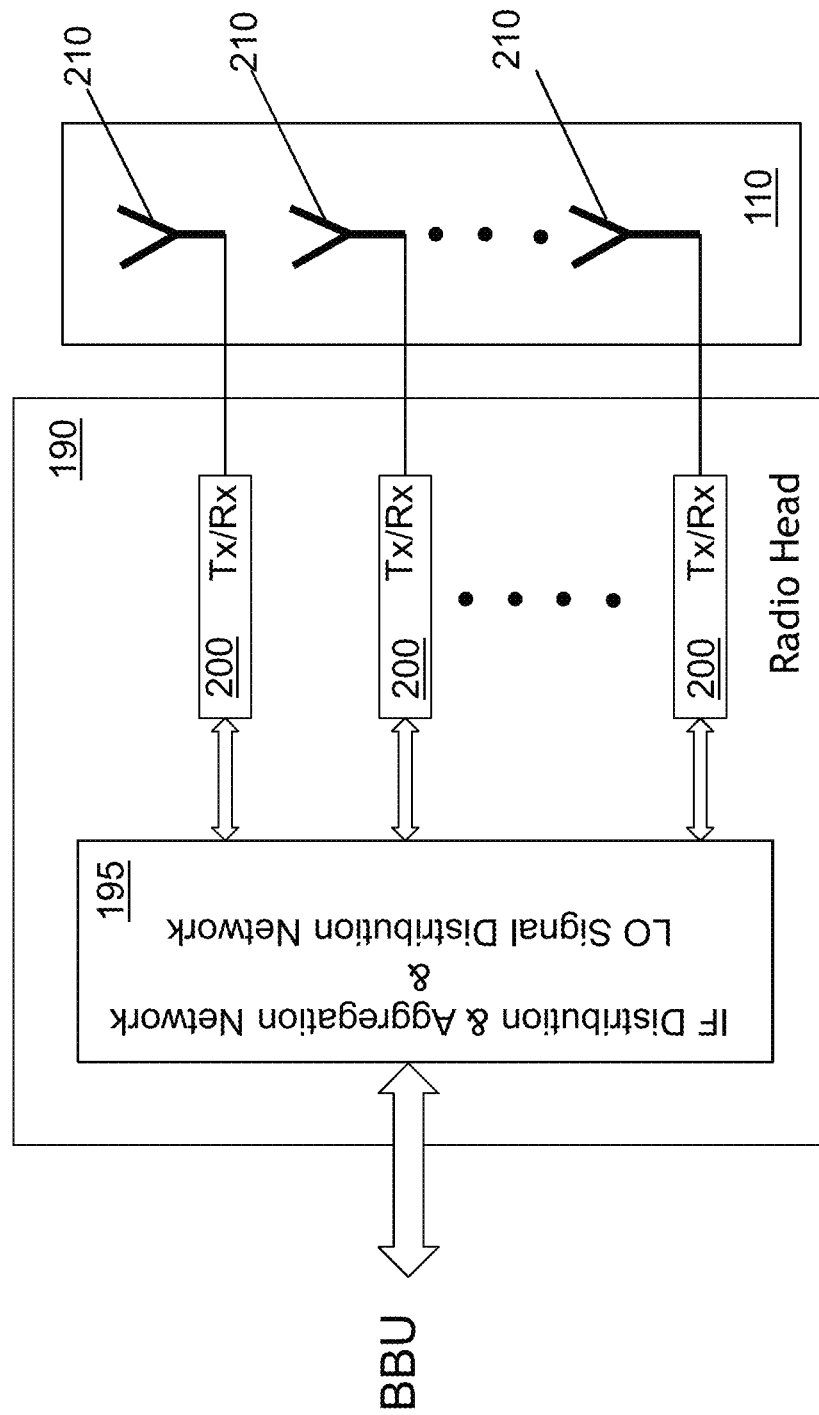
FIG. 13 is an exemplary high-level block diagram showing the internal structure of an exemplary radio head and phased array antenna.

Referring to FIG. 13, in this illustrated embodiment, the antenna array 110 includes a two-dimensional array of M antenna elements. The radio head 190 includes multiple front-end modules (Tx/Rx modules) 100, equal in number to the number of antenna elements in the array, namely, M. There is a Tx/Rx module 100 for each antenna element. There is also a signal distribution network 195 that includes an IF distribution and aggregation network and an LO signal distribution network. This signal distribution network 195 delivers transmit signals from the BBU to the Tx/Rx modules 100, delivers received signals from the Tx/Rx modules 100 to the BBU, and provides coherent local oscillator signals to the Tx/Rx modules 100 for up-converting IF transmit signals to RF transmit signals and for down-converting RF received signals to IF received signals.

Figure 14:
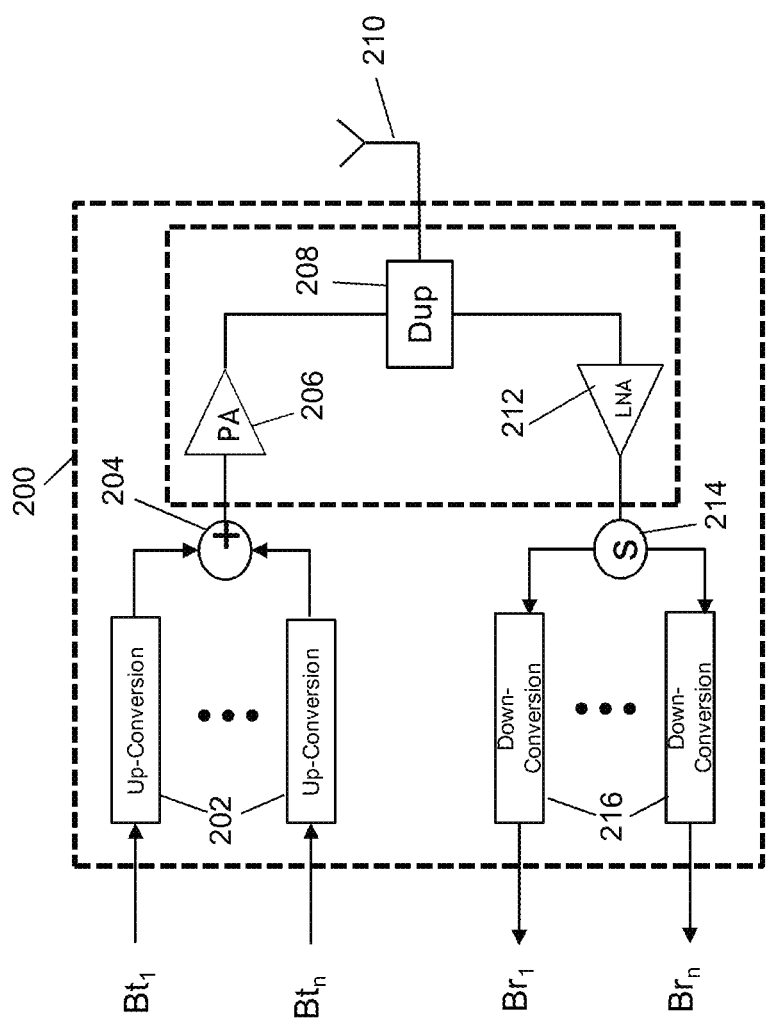
FIG. 14 is an exemplary high-level block diagram of a Tx/Rx module such as is shown in FIG. 13.

FIG. 14 shows a block diagram of the circuitry that connects to a single antenna element 210 of the multi-element antenna array. In the antenna array system having M antenna elements, this circuitry is duplicated for each antenna element. For each antenna element 210, there is a front-end module (or Tx/Rx module) 200 connected to the antenna element 210. The front-end module has a transmitter side and a receiver side. The transmitter side includes N up-conversion modules 202, a combiner circuit 204, and a power amplifier (PA) 206. The receiver side includes a low noise amplifier (LNA) 212, a splitter 214, and N down-conversion modules 216. The N up-conversion modules 202 enable the array to generate N independent transmit beams and the N down-conversion modules 216 enable the array to generate N independent receive beams. The front-end module 200 also includes a duplexer circuit 208 that couples the drive signal from the PA 206 on the transmitter side to the antenna element 210 and couples a received signal from the antenna element 210 to the LNA 212 on the receiver side. The input of each up-conversion module 202 is for receiving a different beam transmit signal stream Bt1 ... Btn from the baseband unit (not shown). And the output of each down-conversion module 216 is for outputting a different beam received signal stream Br1 ... Brn. Typically, each beam transmit signal stream is mapped to a different beam that is generated by the active antenna array system and each received signal stream corresponds to the signal received by a different receive beam formed by the active antenna array.

Figure 1:
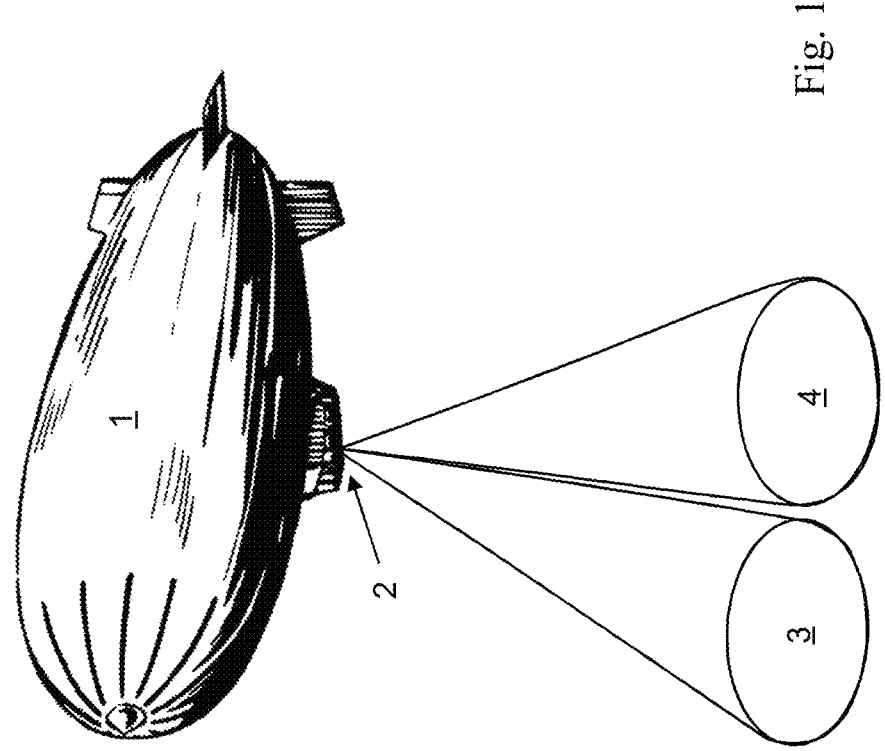
FIG. 1 is a schematic representation of HAP with a planar array forming 2 cells (narrow beams).
Figure 2:
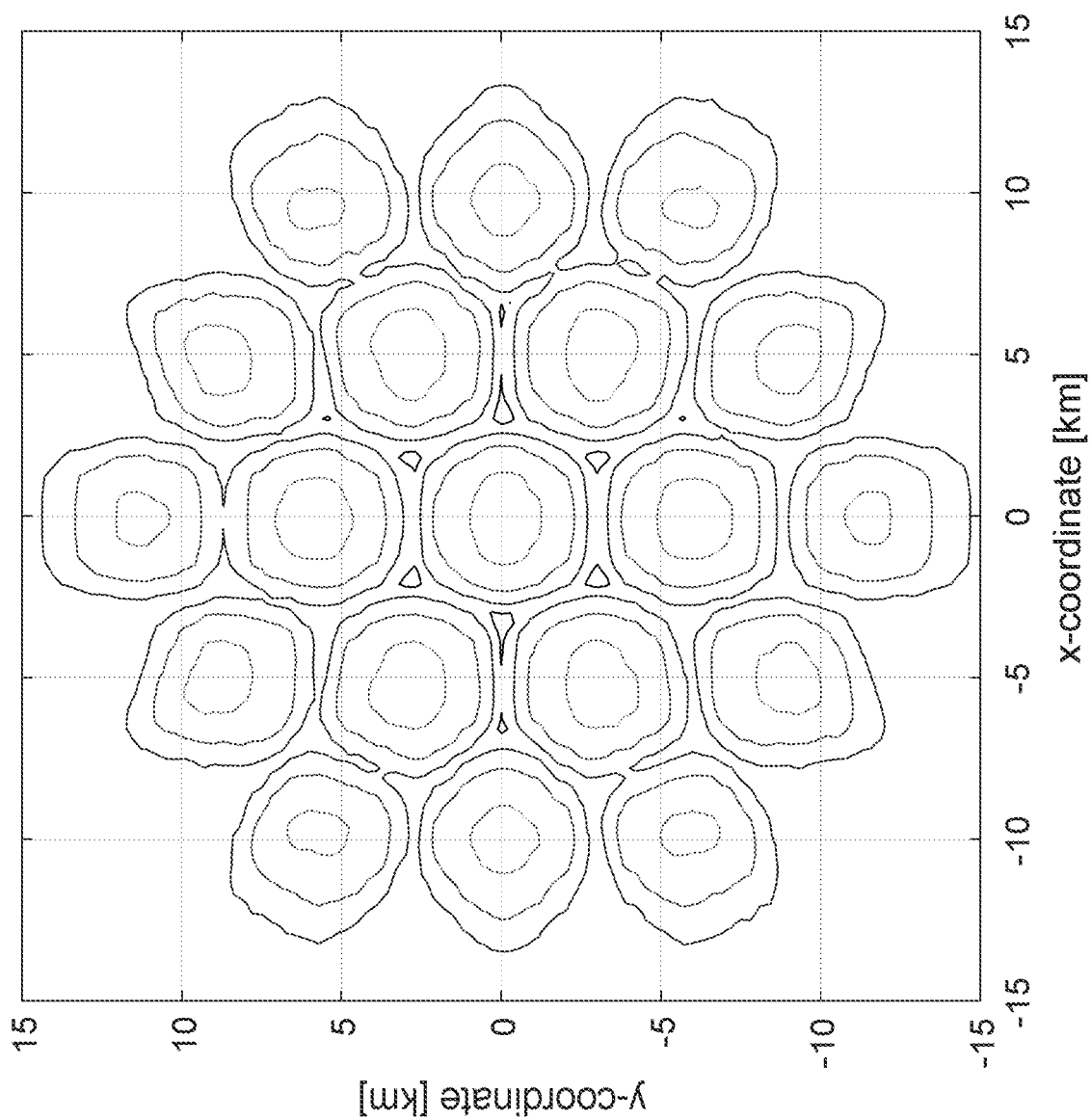
FIG. 2 depicts simulated SINR contour of a 14×14 planar array with ICD of 6 km.
Figure 3:
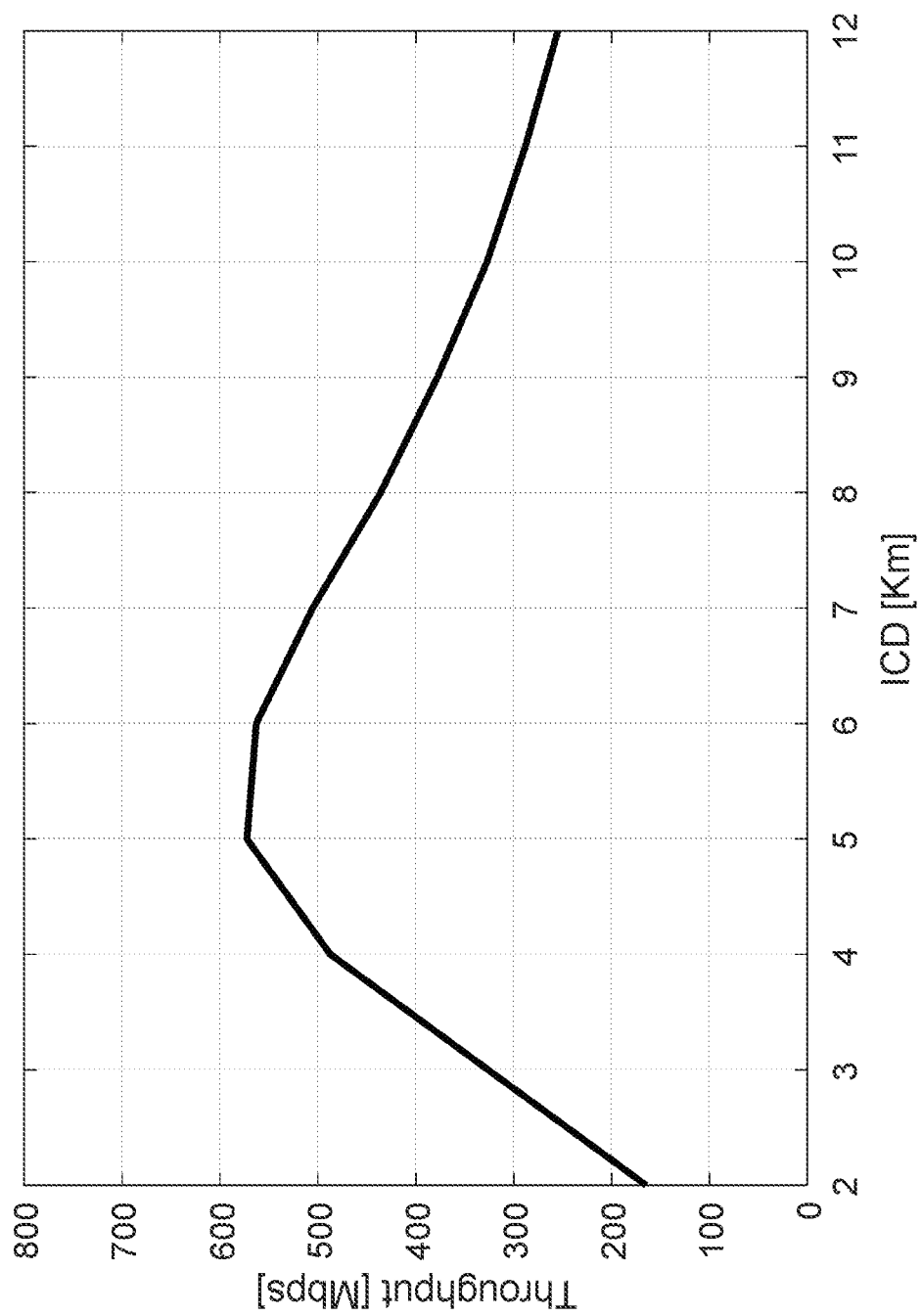
FIG. 3 depicts simulation results of throughput of a 14×14 planar array versus ICD.
Figure 15:
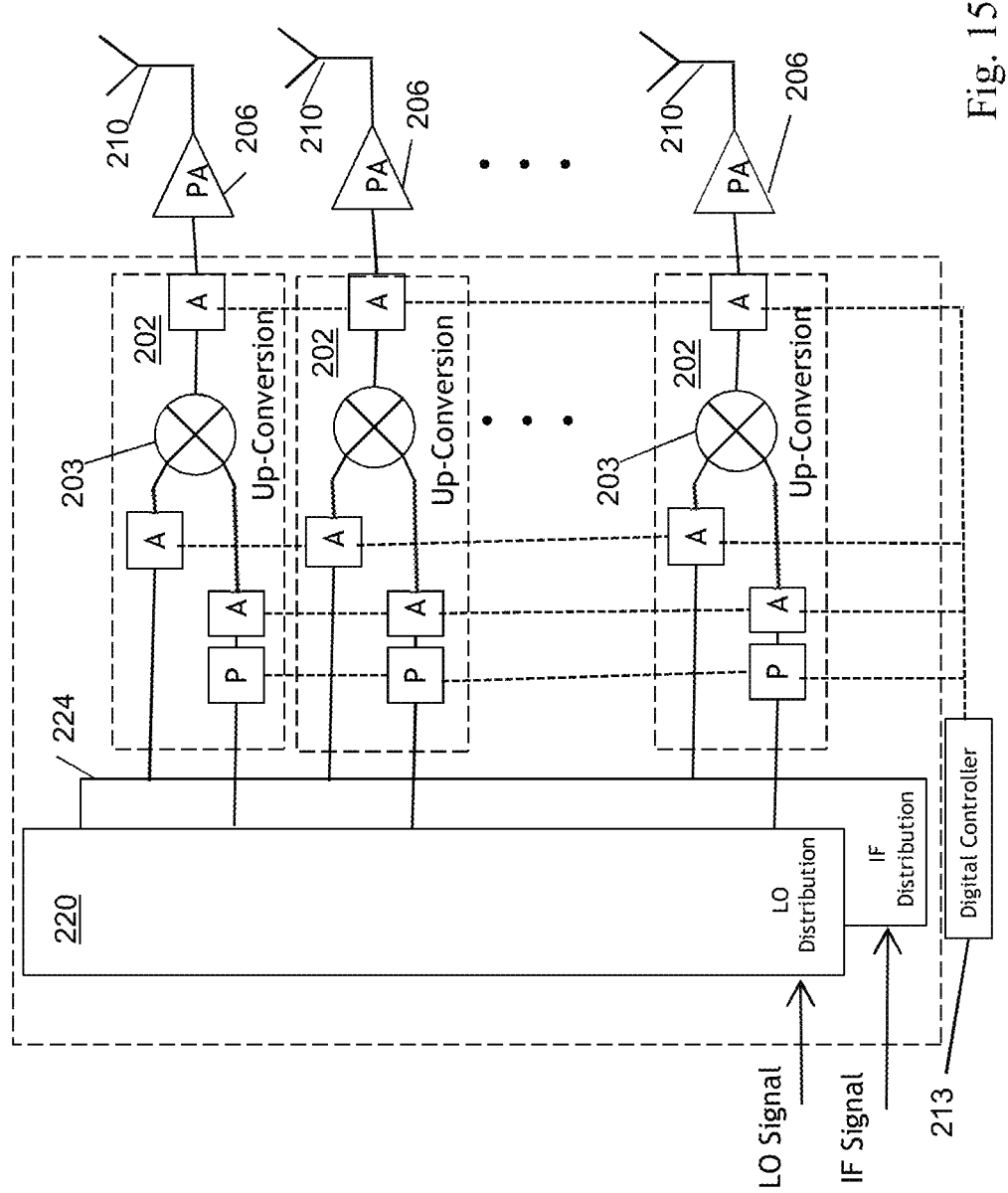
FIG. 15 is an exemplary block diagram of the transmitter side of an active antenna array system showing the circuitry for only one of multiple transmit beams.
Figure 16:
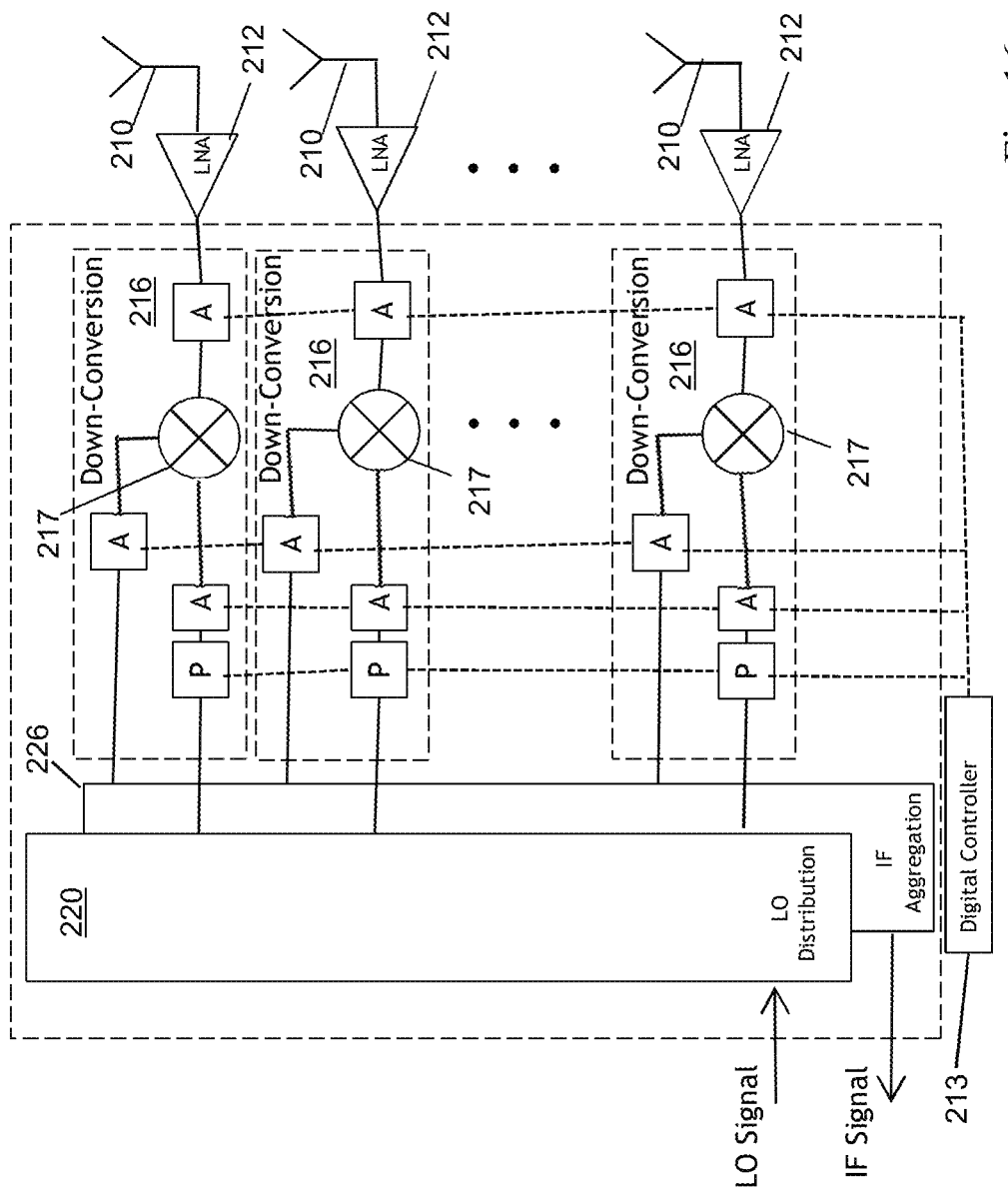
FIG. 16 is an exemplary block diagram of the receiver side of an active antenna array system showing the circuitry for only one of multiple receive beams.

An active antenna array system in which the up-conversion modules 202 are shown in greater detail is depicted in FIG. 15; and an active antenna array system in which the down-conversion modules 216 are shown in greater detail is depicted in FIG. 16. As a practical matter, these two systems, which are shown separately, would be implemented in the same active antenna array system but to simplify the figures, they are presented here separately. The active antenna array system of FIG. 15 is for transmitting one transmit signal stream over a single transmit beam that is generated by the M elements 210 of the antenna array. Because there is only one up-conversion module 202 for each antenna element 210, the combiner 204, which was shown in FIG. 14, is not necessary, so it has been omitted. Similarly, the active antenna array system of FIG. 16 is for receiving a signal stream on a single receive beam pattern that is generated by the antenna array. Again, because there is only one down-conversion module 216 for each antenna element 210, the splitter 214, which was shown in FIG. 3, is not necessary so it has also been omitted.

Figure 4:
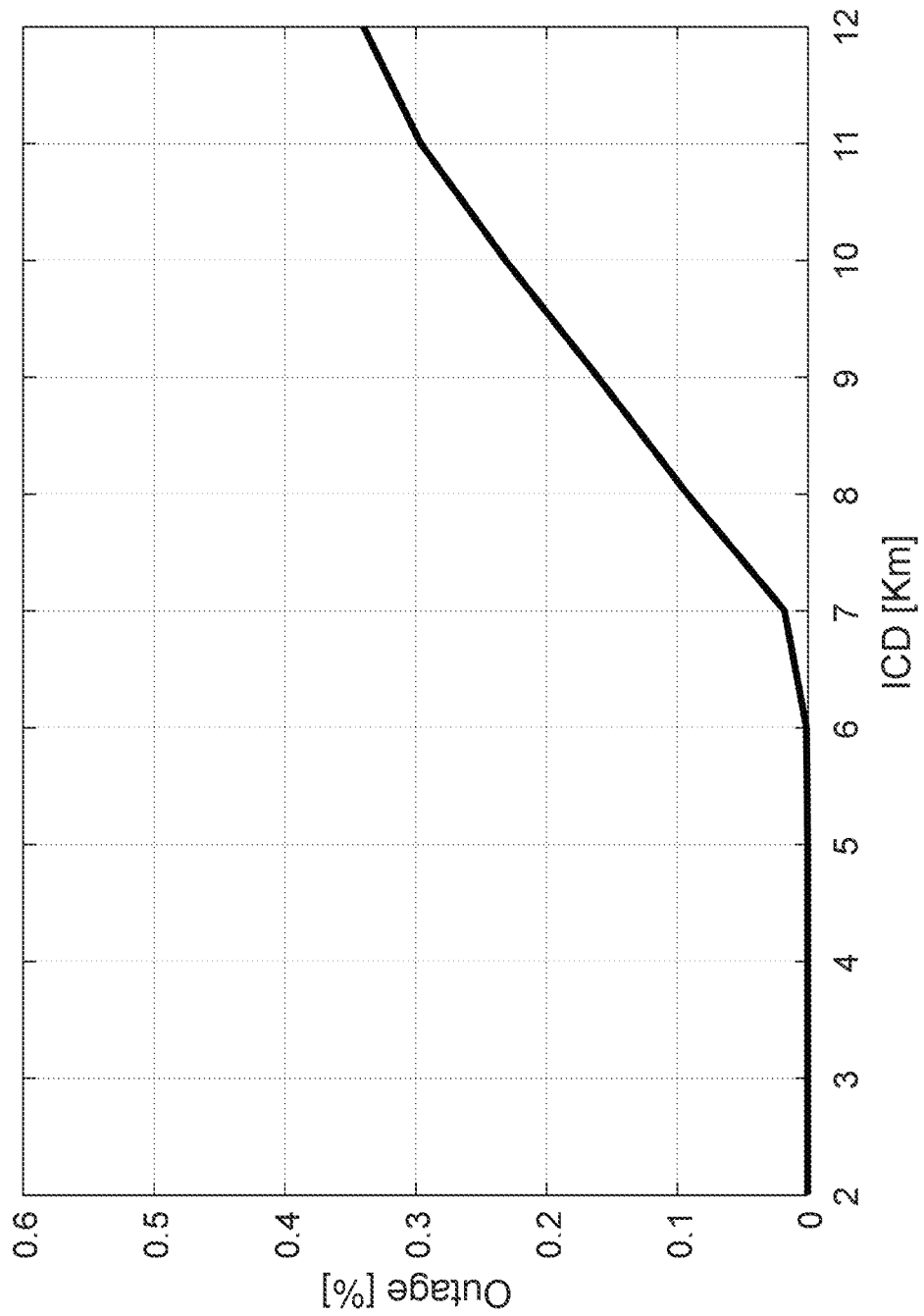
FIG. 4 depicts simulation results of outage of a 14×14 planar array versus ICD.
Figure 5:
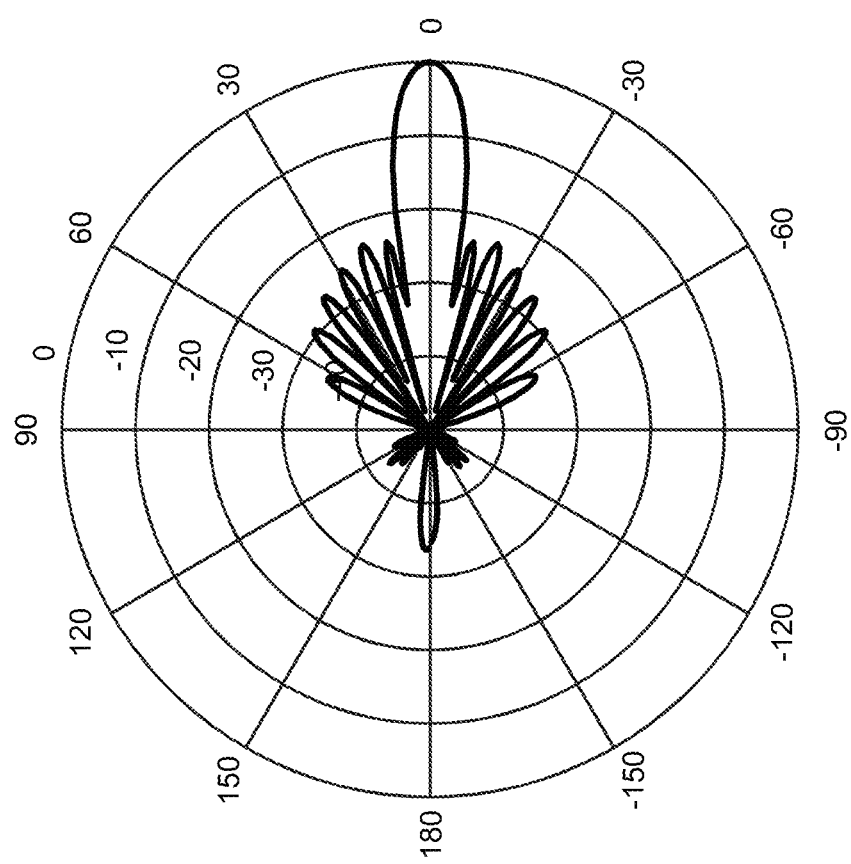
FIG. 5 depicts the horizontal beam pattern of a 14×14 planar array.
Figure 6:
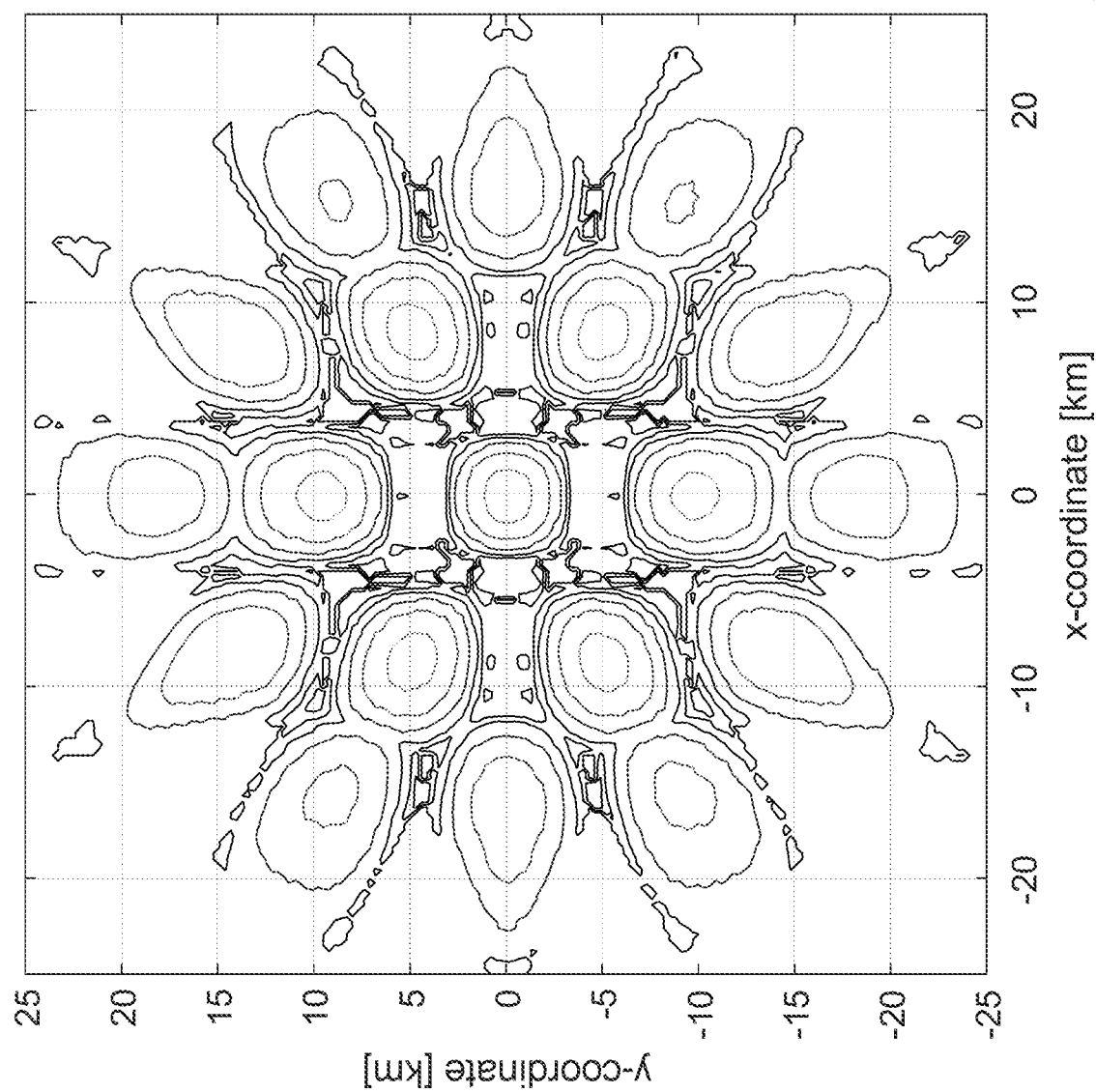
FIG. 6 depicts simulated SINR contours of a 14×14 planar array with ICD of 10 km.

There is an LO distribution network 220 for distributing a coherent or phase synchronized LO (local oscillator) signal to the M up-conversion modules 202 and the M down-conversion modules 216. As shown in FIG. 4, there is also an IF distribution network 224 for delivering the IF transmit signal to each of the up-conversion modules 202. And as shown in FIG. 5, there is an IF aggregation network 226 for aggregating the received signals from each of the down-conversion modules 216.

The distribution and aggregation networks may be passive linear reciprocal networks with electrically identical paths to ensure the coherent distribution/aggregation of signals. Alternatively, one or more of these networks may be implemented using the bidirectional signaling network described in U.S. Pat. No. 8,259,884, entitled "Method and System for Multi-Point Signal Generation with Phase Synchronized Local Carriers," filed Jul. 21, 2008 and U.S. Pat. No. 8,622,959, entitled "Low Cost, Active Antenna Arrays," filed Jun. 30, 2011 or the serial interconnection approach described in U.S. Pat. No. 9,673,965, entitled "Calibrating a Serial Interconnection," filed Sep. 8, 2016, the contents of all of which are incorporated herein by reference.

In general, each up-conversion module 202 includes a mixer 203 and various amplitude and phase setting circuits identified by A and P, respectively. The LO signal and the distributed IF transmit signal stream are both provided to the mixer 203 which up-converts the IF transmit signal stream to an RF transmit signal stream that is provided to the power amplifier 206. Similarly, each down-conversion module 216 also includes a mixer 217 and various amplitude and phase setting circuits similarly identified by A and P, respectively. The mixer 217 in the down-conversion module 216 multiplies the LO signal provided by the LO distribution network 220 and the received RF signal stream from the low noise amplifier 212 that is coupled to the antenna element 210 to generate a down-converted IF received signal stream. The down-converted IF signal stream is provided to the IF aggregation network 226 for aggregation with the IF received signal streams from the other antenna elements and for transfer back to the base station.

The amplitude and phase setting circuits A and P are used for changing the relative phase or amplitude of individual antenna signals to thereby establish the size, direction, and intensity of the transmit and receive beam patterns that are generated by the antenna array. (Note: In an antenna array, a transmit beam is a radiation pattern that is generated by the antenna array. That radiation pattern can be measured in front of the antenna array. In contrast, a receive beam is not a radiation pattern formed by the antenna array but rather is a pattern of antenna sensitivity. Nevertheless, in spite of this difference, they are both generally referred to as beams.) The amplitude setting circuit is basically equivalent to a variable gain amplifier in which the ratio of the output signal amplitude to the input signal amplitude is programmable and is set by electronic control. The phase setting circuit has the fundamental capability of shifting the input signal in phase (or time) under electronic control. These amplitude and phase setting circuits are controlled by digital control signals supplied by a separate control processor 213.

The typology of the amplitude setting and phase setting circuits shown in FIGS. 15 and 16 is just one of many possibilities for giving the basic transmitter and receiver the capability to control independently the amplitude and phase values of the individual antenna signals. The number and placement of the amplitude and phase setting circuits can vary from what is illustrated in FIGS. 15 and 16. In addition, there are other components which might be present in the up-conversion and down-conversion modules but which are not shown in the figures because they are well known to persons skilled in the art. These might include, for example, channel IF filters and automatic gain controls.

In addition to the phased array radio equipment which feeds the antenna structure, the baseband equipment will also be located on the HAP inside the nacelle and there will be some sort of point-to-point backhaul link from the HAP to a ground station. However, the link between the BBU and the radio head may not be CPRI; it could be eCPRI or some other short-haul transport since the baseband equipment is in close proximity of the radio equipment.

Other embodiments are within the following claims. For example, the panels do not need to be flat or rectangular. In addition, the antenna elements can be dual elements (e.g. cross-polarized or inversely circular-polarized). Also, the platform on which the panels are mounted need not be an airborne platform but could also be a very tall building or tower.

What is claimed is:

1. A method of providing cellular coverage on the ground, said method comprising:
    locating an antenna system above the earth, said antenna system comprising S phased array panels arranged about a common vertical axis, wherein each phased array panel of the S phased array panels is an array of antenna elements and has a downward tilt, wherein the S phased array panels are organized into a plurality of groups of phased array panels, each group of phased array panels among the plurality of groups of phased array panels including an integer number of adjacent phased array panels among the S phased array panels, wherein L is an integer greater than 1, and S is an integer greater than L;
    generating a first plurality of narrow directed beams covering a first plurality of cells, said first plurality of cells forming an outer ring of cellular coverage on the surface of the earth; and
    generating a second plurality of narrow directed beams covering a second plurality of cells, said second plurality of cells forming an inner ring of coverage on the surface of the earth, wherein the inner ring of coverage is within the outer ring of coverage,
    wherein generating the first plurality of narrow directed beams comprises, with each phased array panel of the S phased array panels, generating N narrow directed beams of the first plurality of narrow directed beams, wherein N is an integer greater than 1; and
    wherein generating the second plurality of narrow directed beams comprises, with each group of phased array panels among the plurality of groups of phased array panels, generating M narrow directed beams of the second plurality of narrow directed beams, wherein M is an integer greater than 0.

2. The method of claim 1, wherein each phased array panel of the S phased array panels is a W by V two-dimensional array of antenna elements wherein W and V are integers greater than one.

3. The method of claim 1, further comprising using R rows of each phased array panel of the plurality of phased array panels to generate a boresight beam covering a region on the earth that is within the inner ring of coverage on the earth, wherein R is an integer that is less than W.

4. The method of claim 1, further comprising using R rows of each phased array panel of the plurality of phased array panels to generate a boresight beam covering a region on the earth that is aligned with the boresight of the antenna system, wherein R is an integer that is less than W.

5. The method of claim 1, wherein N is 2 and the total number of narrow directed beams within the first plurality of narrow directed beams is 2S.

6. The method of claim 5, wherein the 2S narrow directed beams of the first plurality of narrow directed beams are evenly spaced around and within the outer ring.

7. The method of claim 6, wherein the outer ring includes 2S cells with the 2S narrow directed beams mapped to the 2S cells so that each cell of the 2S cells is covered by a corresponding different one of the 2S narrow directed beams.

8. The method of claim 1, wherein L is 2 and M is 2 and the total number of narrow beams within the second plurality of narrow directed beams is S.

9. The method of claim 8, wherein the inner ring of coverage includes S/2 cells with the S narrow directed beams of the second plurality of narrow directed beams is mapped to the S/2 cells so that each cell of the S/2 cells is covered by a corresponding different pair of the S narrow directed beams of the second plurality of narrow directed beams.

10. The method of claim 1, wherein S is an even integer.

11. The method of claim 1, wherein S is selected from the group consisting of 4, 6, 8, and 12.

12. The method of claim 2, wherein V is 1.

13. The method of claim 3, wherein the R rows of each phased array panel of the S phased array panels that are used to generate a narrow boresight beam are the lowest R rows of each phased array panel of the S phased array panels, wherein R is an integer that is less than W.

14. A method of operating an antenna system to provide cellular coverage on the ground, said antenna system comprising S phased array panels arranged about a common vertical axis, wherein each phased array panel of the S phased array panels is an array of antenna elements and has a downward tilt, wherein the S phased array panels are organized into a plurality of groups of phased array panels, each group of phased array panels among the plurality of groups of phased array panels including an integer number of adjacent phased array panels among the S phased array panels, wherein L is an integer greater than 1, and S is an integer greater than L, the method comprising;

generating a first plurality of narrow directed beams covering a first plurality of cells, said first plurality of cells forming an outer ring of cellular coverage on the surface of the earth; and generating a second plurality of narrow directed beams covering a second plurality of cells, said second plurality of cells forming an inner ring of coverage on the surface of the earth, wherein the inner ring of coverage is within the outer ring of coverage, wherein generating the first plurality of narrow directed beams comprises, with each phased array panel of the S phased array panels, generating N narrow directed beams of the first plurality of narrow directed beams, wherein N is an integer greater than 1; and wherein generating the second plurality of narrow directed beams comprises, with each group of phased array panels among the plurality of groups of phased array panels, generating M narrow directed beams of the second plurality of narrow directed beams, wherein M is an integer greater than 0.

15. The method of claim 14, wherein each phased array panel of the S phased array panels is a W by V two-dimensional array of antenna elements wherein W and V are integers greater than one.

16. The method of claim 14, further comprising using R rows of each phased array panel of the plurality of phased array panels to generate a boresight beam covering a region on the earth that is within the inner ring of coverage on the earth, wherein R is an integer that is less than W.

17. The method of claim 14, further comprising using R rows of each phased array panel of the plurality of phased array panels to generate a boresight beam covering a region on the earth that is aligned with the boresight of the antenna system, wherein R is an integer that is less than W.

18. The method of claim 14, wherein N is 2 and the total number of narrow directed beams within the first plurality of narrow directed beams is 2S.

19. The method of claim 18, wherein the 2S narrow directed beams of the first plurality of narrow directed beams are evenly spaced around and within the outer ring.

20. The method of claim 19, wherein the outer ring includes 2S cells with the 2S narrow directed beams mapped to the 2S cells so that each cell of the 2S cells is covered by a corresponding different one of the 2S narrow directed beams.

21. The method of claim 14, wherein L is 2 and M is 2 and the total number of narrow beams within the second plurality of narrow directed beams is S.

* * * * *